2,956,069

NON-CELLULAR HAZE-FREE POLYURETHANE COMPOSITION

Waclaw Szukiewicz, Snyder, N.Y., assignor to Allied Chemical Corporation, New York, N.Y., a corporation of New York No Drawing. Filed Oct. 29, 1958, Ser. No. 770,284

3 Claims. (Cl. 260—404.5)

This invention relates to an improved polyurethane composition and more particularly refers to a new and improved non-cellular polyurethane composition for the production of films, coatings, adhesives and potting compounds.

The use of castor oil-organic diisocyanate reaction products for the preparation of adhesives and potting compositions is known. These prior art compositions are generally of the type in which there are no or very few free isocyanate groups in the final product. Of particular interest to the present application is diphenylmethane-4,4'-diisocyanate. This diisocyanate results in products having good flexibility, abrasion resistance and strength, e.g. high tensile strength of unsupported films and good bond strength for glass-to-glass adhesion. Unfortunately these castor oil-diphenylmethane-4,4'-diisocyanate products have one serious disadvantage, viz. a general haziness or opaqueness of the compositions and of the films and potting compounds prepared from such compositions. This lack of clarity is especially undesirable for films and encapsulating compositions. A principal cause for the haziness is believed due to the room temperature crystallization of the excess diphenylmethane-4,4'-diisocyanate and reaction by-products in the desired product.

An object of the present invention is the preparation of an improved polyurethane composition from castor oil and diphenylmethane-4,4'-diisocyanate. A further object of the invention is the production from castor oil and diphenylmethane-4,4'-diisocyanate of coatings, films and potting compounds, which are free from haze but which retain essentially the excellent properties of compositions of this type.

In accordance with the present invention non-cellular haze-free polyurethane composition eminently suitable for the production of clear adhesives possessing good bond strength and for the production of strong clear films and potting compounds having superior resistance to abrasion, chemicals, moisture and high temperature may be prepared by reacting castor oil with diphenylmethane-4,4'-diisocyanate in the proportion that the ratio of isocyanate groups from diphenylmethane-4,4'-diisocyanate should not exceed 2.1 and should not be below 1.5, preferably in the range of 1.8:1 to 2.1:1 and adding toluene diisocyanate to the castor oil-diphenylmethane-4,4'-diisocyanate reaction product in an amount sufficient to raise the total number of isocyanate groups in the mixture to a level such that the ratio of NCO:OH is at least 2.1:1 and not greater than 3.5:1, said toluene diisocyanate constituting at least 4% by weight of the diphenylmethane-4,4'-diisocyanate and preferably 6 to 15%.

The process of the present invention may be carried out by heating with stirring a mixture of castor oil and diphenylmethane-4,4'-diisocyanate at a temperature between about 50–150° C., preferably within the range of 60–100° C., to form an adduct which generally requires about ½ to 1½ hours. It is important in order to obtain a satisfactory product to react the diphenylmethane-4,4'-diisocyanate with castor oil in the proportion not to exceed 3.15 mols diphenylmethane-4,4'-diisocyanate for each mol of castor oil and not less than 2.25 mols of diphenylmethane-4,4'-diisocyanate for each mol of castor oil, corresponding to an NCO/OH ratio of 2.1 and 1.5 respectively. Preferably, the ratio of isocyanate groups from the diphenylmethane-4,4'-diisocyanate to hydroxyl groups in the castor oil should not exceed 2.0. The reaction should be conducted under substantially anhydrous conditions—trace amounts of moisture not in excess of 0.1% may be tolerated. Part or all of the toluene diisocyanate may be added to the initial castor oil and diphenylmethane-4,4'-diisocyanate, but it is preferably added to the castor oil—diphenylmethane-4,4'-diisocyanate reaction product as described below.

To the diphenylmethane-4,4'-diisocyanate-castor oil reaction product is added a small amount of toluene diisocyanate sufficient to raise the total number of isocyanate groups in the reaction mixture relative to the hydroxyl groups to a ratio of at least 2.1:1 and not greater than 3.5:1—usually 4–15% by weight toluene diisocyanate based on the weight of diphenylmethane-4,4'-diisocyanate. The resulting mixture is then heated for a short time, roughly about 15 to 30 minutes, at a temperature within the range of about 50 to 150° C. The product is a liquid and even after storing for more than a month is free of crystal formation. For the production of unsupported films the product may be dissolved in the conventional solvents, usually an aromatic solvent such as toluene to which is added a small amount of a catalyst. Both the organic solvent and the catalyst should be water free. The catalyst employed to promote the cure of these castor oil-diisocyanate compositions may be any suitable tertiary amine normally used to accelerate the reaction of isocyanate groups with urethane or urea groups resulting in cross-linking and high polymer formation; typical of such tertiary amines are N-alkyl morpholines, trialkylamines, N-dialkyl piperazines, and N-alkyldiethanolamines, e.g. N-ethyldiethanolamine.

The more detailed practice of the invention is illustrated by the following examples, in which parts given are by weight.

EXAMPLE 1

*Preparation of urethane intermediate from castor oil*

Castor oil having a hydroxyl number of 174=equivalent (OH) weight of 322 was employed as one of the reactants. "Nacconate 300" (383 parts of 98% strength diphenylmethane-4,4'-diisocyanate equivalent to 375 parts of pure compounds=3 NCO equivalents) was melted by heating in a dry nitrogen atmosphere at 60° C. and the castor oil (480 parts equivalent 322=1.49 OH equivalents) added stepwise with constant stirring at a reaction temperature of 60–70° C. The reaction mixture was heated at this temperature (60–70° C.) for a total time of one hour before adding "Nacconate 80" (28 parts of 98% strength toluene diisocyanate isomers, 80% 2,4- and 20%, 2,6- equivalent to 27.4 parts of pure toluene diisocyanate=.315 NCO equivalents), after which the temperature was held at 70° C. for 20 minutes (total ratio of NCO/OH groups=2.23/1). The resulting product was cooled and stored under dry nitrogen, the viscosity of the liquid when freshly prepared was 250,000 centipoises (20° C.) and crystal formation did not occur even after one month's storage.

When the process was repeated without "Nacconate 80" but using diphenylmethane-4,4'-diisocyanate in such proportion that the ratio of NCO/OH groups was 2.24/1, a liquid product was obtained which at room temperature remained clear for about five days but then became hazy.

EXAMPLE 2

*Preparation of unsupported film*

To obtain unsupported films the castor oil-diisocyanate reaction product is dissolved in an equal weight of a suitable inert solvent, e.g. dry toluene and about 0.5% by weight of a tertiary amine catalyst, e.g. N-methyl morpholine, is added. The mixture is poured on a clear mercury surface, a room temperature cure time of 5 to 8 hours is usual before the film can be stripped off and the curing is completed in an air oven at 100° C. for two hours.

The resulting film was strong, flexible and clear and free of haze, whereas a similar film obtained from castor oil reacted with an equivalent amount of diphenylmethane-4,4'-diisocyanate only, was very hazy.

Physical properties of the films are listed below:

|  | Tensile Strength, p.s.i. | Elongation, Percent | Abrasion Loss [1] |
|---|---|---|---|
| Control | 4,162 | 150 | 0.2077 |
| Product with tolylene diisocyanate | 4,145 | 120 | 0.1275 |

[1] Abrasions loss is expressed as grams loss in weight, after 2,000 cycles with an H-22 wheel and a 1,000 gram weight.

EXAMPLE 3

*Potting compounds*

For potting or encapsulating uses the castor oil-diisocyanate reaction product (prepared as in Example 1 above) is degassed before and after the addition of the tertiary amine catalyst (approximately 1–2% of anhydrous amine such as N-methyl morpholine). The resulting mixture has a working life of about four hours, after which the viscosity is too great to avoid air entrapment; curing is completed at room temperature in about 24 hours or at 105° C. for about 6 hours.

The completely cured potting compounds so produced have an extremely low water absorption (less than 0.09% after 24 hours immersion), are haze-free and non-brittle possessing a marked degree of flexibility, resulting in good resistance to mechanical impact.

EXAMPLE 4

150 grams of melted and filtered diphenylmethane-4,4'-diisocyanate (100%=1.2 NCO equivalents) and 14 grams of toluene diisocyanate 100%, a mixture of approximately 80% of the 2,4- and 20% of the 2,6-isomers=0.16 NCO equivalents, were mixed under a nitrogen atmosphere and 210 grams of dried castor oil (Baker Castor Oil Co., DB type) (equivalent wt.=350=0.6 OH equivalents) were added. The drying was performed by heating the oil under a vacuum below 5 mm. at 130° C. for 3 hours. The mixture of castor oil and diisocyanates was heated to 110–115° C. and held at that temperature for 30 minutes. Then 56 grams more of the same toluene diisocyanate isomeric mixture (0.64 NCO equivalent) were added and the mixture was heated for 15 minutes at 110–115° C. The mixture was degassed at below 5 mm. vacuum for 30 minutes while cooling it down below 60° C. 1% ethyldiethanolamine was added as catalyst, after which the mass was agitated for 2–3 minutes and poured on the mold and degassed. A clear product was produced. When diphenylmethane-4,4'-diisocyanate was used without toluene diisocyanate in such proportion as to provide an NCO/OH ratio of 3.3 to 1, a hazy product was obtained.

Although certain preferred embodiments of the invention have been disclosed for purpose of illustration, it will be evident that various changes and modifications may be made therein without departing from the scope and spirit of the invention.

I claim:

1. A method of preparing non-cellular haze-free polyurethane composition for the production of clear films, coatings, adhesives and potting compounds which comprises heating a mixture of castor oil and diphenylmethane-4,4'-diisocyanate at a temperature between about 50–150° C. for around ½ to 1½ hours in the proportion that the ratio of isocyanate groups from diphenylmethane-4,4'-diisocyanate to hydroxyl groups from castor oil is not in excess of 2.1:1 and is not below 1.5:1, and adding toluene diisocyanate to the castor oil-diphenylmethane-4,4'-diisocyanate reaction product and heating the mixture at a temperature between about 50–150° C., said toluene diisocyanate being in an amount of at least 4% by weight of the diphenylmethane-4,4'-diisocyanate and sufficient to raise the total number of isocyanate groups in the mixture to a level such that the ratio of NCO:OH is at least 2.1:1 and not greater than 3.5:1.

2. A method of preparing non-cellular haze-free polyurethane composition for the production of clear films, coating, adhesives and potting compounds which comprises heating a mixture of castor oil and diphenylmethane-4,4'-diisocyanate at a temperature between about 50–150° C. for around ½ to 1½ hours in the proportion that the ratio of isocyanate groups from diphenylmethane-4,4'-diisocyanate to hydroxyl groups from castor oil is in the range of 1.8:1 to 2.1:1, and adding toluene diisocyanate to the castor oil-diphenylmethane-4,4'-diisocyanate reaction product and heating the mixture at a temperature between about 50–150° C., said toluene diisocyanate being in an amount of at least 4% by weight of the diphenylmethane-4,4'-diisocyanate and sufficient to raise the total number of isocyanate groups in the mixture to a level such that the ratio of NCO:OH is at least 2.1:1 and not greater than 3.5:1.

3. A non-cellular haze-free polyurethane composition for the production of clear films, coatings, adhesives and potting compounds prepared by heating a mixture of castor oil and diphenylmethane-4,4'-diisocyanate at a temperature between about 50–150° C. for around ½ to 1½ hours in the proportion that the ratio of isocyanate groups from diphenylmethane-4,4'-diisocyanate to hydroxyl groups from castor oil is not in excess of 2.1:1 and is not below 1.5:1, and adding toluene diisocyanate to the castor oil-diphenylmethane-4,4'-diisocyanate reaction product and heating the mixture at a temperature between about 50–150° C., said toluene diisocyanate being in an amount of at least 4% by weight of the diphenylmethane-4,4'-diisocyanate and sufficient to raise the total number of isocyanate groups in the mixture to a level such that the ratio of NCO:OH is at least 2.1:1 and not greater than 3.5:1.

References Cited in the file of this patent

UNITED STATES PATENTS

| 2,621,166 | Schmidt et al. | Dec. 9, 1952 |
| 2,769,826 | Yoho | Nov. 6, 1956 |
| 2,772,245 | Simon | Nov. 7, 1956 |